March 19, 1963 W. R. BAUER Re. 25,351

ELECTROMAGNETIC RELAY AND ARMATURE THEREFOR

Original Filed Sept. 4, 1959

United States Patent Office

Re. 25,351
Reissued Mar. 19, 1963

25,351

ELECTROMAGNETIC RELAY AND ARMATURE THEREFOR

Werner Robert Bauer, Columbus, Ohio, assignor to Robertshaw-Fulton Controls Company, Richmond, Va., a corporation of Delaware Original No. 3,022,399, dated Feb. 20, 1962, Ser. No. 838,262, Sept. 4, 1959. Application for reissue Sept. 21, 1962, Ser. No. 226,769
12 Claims. (Cl. 200—87)

Matter enclosed in heavy brackets [ ] appears in the original patent but forms no part of this reissue specification; matter printed in italics indicates the additions made by reissue.

This invention relates to electromagnetic relays.

An electromagnetic relay is customarily comprised of a switch means which is movable between controlling positions in response to energization and deenergization of an electromagnet or solenoid. The electromagnet attracts an armature to cause movement of the switch means. To increase the attractive force acting upon the armature without increase in the energizing current, or to decrease the energizing current and hold the attractive force constant, it is desirable to reduce the resistance of the magnetic circuit in its most effective portion, e.g., the air gap. One method of accomplishing this would be to move the armature closer to the core of the coil assembly; however, this is not desirable in many instances since it might also reduce the amount of armature travel below that amount necessary to actuate the switch means. Accordingly, it is an object of this invention to reduce the magnetic resistance by reducing the air gap without adversely affecting mechanical movement of the armature.

Another object of this invention is to allow the attractive force to remain the same and yet reduce the energizing current.

Another object of this invention is to develop a better contact pressure by reducing the possibility of oscillations, which would normally be developed when using a coil spring for biasing the armature.

A further object of this invention is to allow the contact pressure to be adjusted so that the armature is balanced.

Still another object of this invention is to prevent side loading of the armature and biasing means from affecting the operation.

Other objects and advantages of this invention will be apparent from the following description taken in connection with the accompanying drawing wherein.

Figure 1:
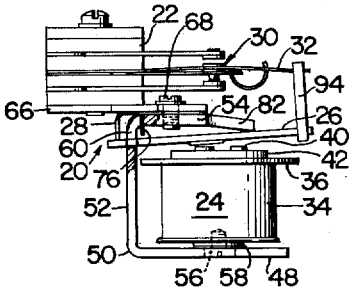
FIG. 1 is a front elevational view, with portions removed, of an embodiment of this invention.
Figure 2:
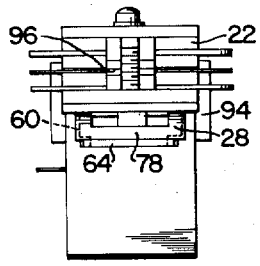
FIG. 2 is an end elevational view of the device shown in FIG. 1.
Figure 3:
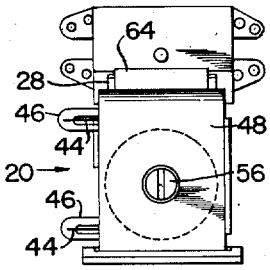
FIG. 3 is a bottom plan view of the device shown in FIG. 1.

Referring now to the drawing and more particularly to FIGS. 1–3, a relay, indicated generally by reference numeral 20, generally comprises a stacked switch assembly 22 operatively connected to be actuated by an electromagnet or solenoid 24 embodying an armature 26 and a spring 28. Switch assembly 22 may include switch means of many forms. By way of example only and for the purposes of illustration, the switch means may take the form of one which operates on the principle of the snap-acting device disclosed in U.S. Patent 2,558,258, Kohl, to which reference may be made for a more detailed description of the theory and principle of operation. As shown, switch assembly 22 includes an adjacent pair of such switch means, 30, 30 disposed on both sides of switch assembly 22. Each switch means 30 is a single pole, double throw, snap-acting switch which is movable between controlling positions in response to movement of an actuating lever 32.

Coil assembly 24 is shown, by way of example only and for the purposes of illustration, in the form adapted to be energized by an alternating current. Coil assembly 24 comprises a coil 34 wound upon a plastic bobbin 36 into which a core 38 (FIGS. 7 and 8) is inserted. Core 38 is formed at its upper end into a pair of D-shaped pole pieces 40. As illustrated by the dotted lines in FIG. 6, pole pieces 40 are separated slightly and are disposed in a back-to-back relationship. A shading coil 42 is provided with a pair of D-shaped apertures (not shown). During assembly, pole pieces 40 are inserted into these apertures and the corner portions of pole pieces 40 are upset to affix coil 42 to core 38. The wire ends 44, 44 of coil 34 are staked to terminals 46, 46 mounted upon a portion of bobbin 36.

Coil assembly 24 is attached to leg 48 of a metallic, U-shaped, magnetic frame 50, comprising a medial section 52 and an upper leg 54, by a screw 56 which extends through an aperture formed in leg 48 and which is screwed into a threaded aperture formed in the bottom end of core 38. A brass washer 58 is disposed between leg 48 and core 38 to reduce residual magnetism.

Leg 54 intersects medial portion 52 at substantially a right angle. At this intersection, portion 52 is formed with a widened T-shaped aperture 60 which extends across a substantial portion of the width of portion 52. Armature 26 is disposed within this aperture so that the reduced wall portion of the T-shaped aperture fits into a pair of slots 62, 62 formed on the sides of armature 26 adjacent to the reduced width end 64, to prevent longitudinal movement of armature 26, yet permit armature 26 to pivot about frame 50.

Switch assembly 22 includes a base plate 66 which is mounted upon frame 50 by a screw 68 which extends through an aperture 70 formed in base plate 66 and through an aperture 72 formed in spring 28 and which is screwed into a threaded aperture formed in leg 54. Spring 28 is thus sandwiched between plate 66 and leg 54 and is formed with an aperture 74 so as to define a tab 76 and a U-shaped cantilever leaf spring having a tip 78 connected by side legs 80, 80 to the main body portion.

Figure 5:
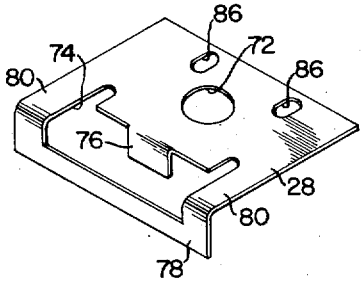
FIG. 5 is a perspective view, on an enlarged scale, of another detail.

As best seen in FIG. 5, tab 76 is bent at a right angle and extends downwardly towards armature 26 but terminates short thereof to provide means for preventing armature 26 from being separated from frame 50. Legs 80, 80 are also bent downwardly at right angles so that tip 78 engages end 64 to bias armature 26 counterclockwise, as viewed in FIG. 1, against stop means in the form of a tab 82 formed from leg 54. Base plate 66 is formed with side slots 84, 84 which overlie legs 80, 80 to allow these legs to move upwardly upon clockwise movement of armature 26 from the position shown in FIGS. 1 and 8.

The width of tip 78 is greater than that of end 64, as best seen in FIG. 3, to provide substantially a line contact whereby there will be an even application of armature 26 on frame 50, even with side loading thereon. Spring 28 is thin and provides a short moment arm having a relatively small unsupported mass so that oscillation is held below that which would occur if a coil spring were used. To allow adjustment of this contact pressure, spring 28 is formed with a pair of slots 86, 86 into which a pair of lugs 88, 88 formed on the underside of plate 66, extend. By loosening screw 68, spring 28 can be slid within limits to the desired position.

Figure 7:
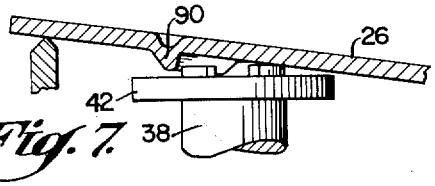
FIGS. 7 and 8 are somewhat schematic views of a portion of the device.
Figure 8:
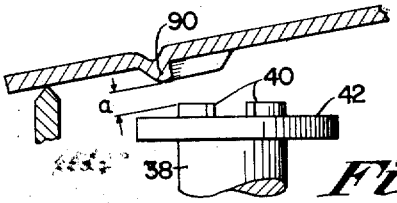
Figure 4:
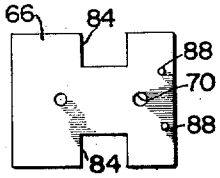
FIG. 4 is a bottom plan view of a detail.
Figure 6:
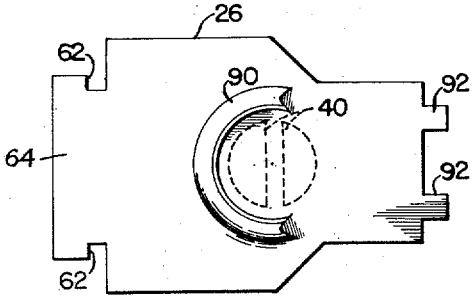
FIG. 6 is a bottom plan view on an enlarged scale, of still another detail.

Armature 26, as best seen in FIGS. 6–8, is formed with air gap reducing means in the form of an arcuate, preferably semi-circular, projection or ridge 90 which extends downwardly from the underside of armature 26 towards pole piece 40. As shown in FIG. 8, armature 26 is in the unattracted position. Dimension "a" represents the air gap in the magnetic circuit. Ridge 90 is movable in an arcuate path but does not engage pole piece 40 to interfere with or hinder movement of armature 26. When armature 26 is horizontal, an upward projection of pole piece 40 would intersect the armature substantially as shown by the dotted lines in FIG. 6.

In one embodiment, and by way of illustration only, the air gap is .023", as opposed to an air gap of .036" for similar armatures not provided with ridges. Ridge 90 is formed in a die so that, although it distorts the grain somewhat, it does not destroy the grain so as to change the magnetic flow. In the attracted position shown in FIG. 7, the lower portion of ridge 90 is below the level of the upper surface of pole piece 40 so as to partially encompass the same.

Armature 26 is provided with a pair of tabs 92, 92 which are inserted through apertures formed in a connector 94 and which are upset to affix connector 94 to armature 26 for movement therewith. Connector 94 is constructed from relatively rigid insulation material and is also formed with a slot 96 (FIG. 2) into which the ends of actuating levers 32 are inserted.

In operation, the terminals of relay 20 are connected to the circuits to be controlled. When coil assembly 24 is deenergized, armature 26 is biased counterclockwise by spring 28, as shown in FIG. 1, against tab 82.

Subsequent energization of coil assembly 24 causes armature 26 to pivot clockwise until, as shown in FIG. 7, the underside of armature 26 engages the right hand portion of pole piece 40. This movement causes end 64 to move tip 78 so that legs 80, 80 move upwardly into slots 84, 84. This movement also causes connector 94 to move actuating lever 32 downwardly to cause switch means 30 to snap between positions. When coil assembly 24 is subsequently deenergized, spring 28 moves armature 26 and connector 94 so that switch means 30 snaps to its normal position.

It will be apparent that many changes may be made in the details of construction and arrangement of parts without departing from the scope of the invention as defined in the appended claims.

I claim:

1. A relay comprising: a U-shaped frame; a coil assembly mounted on one of the legs of said frame and extending towards the other leg but terminating short thereof; an armature pivoted on a portion of the medial section of said frame and extending between said coil assembly and said other leg, said armature being formed with air gap reducing means; a switch assembly including a base plate mounted on said other leg, said switch assembly further including switch means operatively connected to said armature; and spring means sandwiched between said other leg and said base plate and including a portion which abuts said armature to bias the same to a controlling position.

2. A relay comprising: a frame including first and second portions joined together to form a right angle, said portions being formed with an aperture; an armature having an end portion which extends through said aperture and being cooperable with said first portion to allow said armature to pivot and to restrain said armature from longitudinal movement; a base plate mounted on said second portion; a leaf spring mounted between said base plate and said second portion and being operatively connected to bias said armature in one direction, said spring including a tab which extends through said aperture and prevents said armature from being separated from said frame.

3. The device of claim 2 wherein said base plate is formed with a pair of lugs and said spring is formed with a cooperating pair of apertures into which said lugs extend, said apertures being substantially larger than said lugs to allow said spring to be moved.

4. A relay comprising: a U-shaped frame; a coil assembly mounted on one of the legs of said frame and extending towards the other leg but terminating short thereof; an armature pivoted on a portion of the medial section of said frame and extending between said coil assembly and said other leg, said armature being formed with a semicircular ridge which cooperates with said coil assembly to reduce the air gap and magnetic resistance; a switch assembly including a base plate mounted on said other leg, said switch assembly further including switch means operatively connected to said armature; and spring means operatively connected between said switch assembly and said frame and being constructed from relatively thin, flat spring material, said spring means being formed with a main body portion, a tab extending away from said main body portion and being adapted to prevent said armature from being removed from said frame, said spring means being formed with apertures therein for adjusting the position of said spring means, and said spring means having two narrow legs extending from said main body portion with each leg bent toward said armature at a point removed from said main body portion, a third leg joining the ends of said narrow legs removed from said main body with an edge of said third leg engaging said armature for biasing said armature toward a controlling position.

5. A relay comprising a coil, a core, a pole piece assembly on said core projecting axially from one end of said coil, an armature overlying said one end of said coil, means supporting said armature for pivotal movement toward and away from said one end of said coil between an unactuated position spaced from said pole piece assembly and an actuated position in contact with said pole piece assembly, switch means operatively coupled to said armature for actuation by said armature, and an air gap reducing ridge projecting from said armature toward said one end of said coil at a location such that said ridge partially encompasses said pole piece assembly in spaced relationship therewith when said armature is in said actuated position, said ridge defining the path of least magnetic resistance between said pole piece assembly and said armature when said armature is in said unactuated position.

6. A relay as defined in claim 5 wherein said means supporting said armature for pivotal movement comprises a frame, and means on said frame cooperable with means on said armature to support said armature for pivotal movement about an axis normal to the axis of said coil at a location spaced from one side of said coil at said one end thereof, said air gap reducing ridge being located between said axis and said pole piece assembly when said armature is in said actuated position.

7. In a relay having a frame, and a relay coil mounted on said frame; a relay armature having a flat portion at one end thereof, cooperating means on said frame and said armature supporting said armature for pivotal movement toward and away from one end of said coil about an axis extending transversely of said armature and parallel to the general plane of said flat portion at a location spaced inwardly of said armature from said one end thereof, a leaf spring member having a fixed end and a free end, said free end of said spring member terminating in a straight edge having a length at least equal to the transverse width of said flat portion of said armature, and means mounting said fixed end of said spring member upon said frame to locate said straight edge of said spring member in contact with said flat portion of said armature along a line extending transversely across said armature in parallel relationship to said axis at a location between said axis and said one end of said armature, the portion of said leaf spring member intermediate said fixed end and said free end being constructed and arranged to resiliently bias said armature away from said one end of said coil.

*8. A relay comprising a coil, a core, a pole piece assembly on said core projecting axially from one end of said coil, an armature overlying said one end of said coil, means supporting said armature for movement toward and away from said one end of said coil between an unactuated position spaced from said pole piece assembly and an actuated position in contact with said pole piece assembly, a device operatively coupled to said armature for actuation by said armature, and an air gap reducing ridge projecting from said armature toward said one end of said coil at a location such that said ridge encompasses a portion of said pole piece assembly in spaced relationship therewith when said armature is in actuated position, said ridge defining the path of least magnetic resistance between said pole piece assembly and said armature when said armature is in said unactuated position.*

*9. A relay as defined in claim 8 wherein said means supporting said armature for movement comprises a frame, and means on said frame cooperable with means on said armature to support said armature for pivotal movement about an axis normal to the axis of said coil at a location spaced from one side of said coil at said one end thereof, said air gap reducing ridge being located between said axis and said pole piece assembly when said armature is in said actuated position.*

*10. A relay as defined in claim 8 in which said ridge is formed in a die on said armature so it does not destroy the grain sufficiently to change the magnetic flow.*

*11. A relay comprising a coil, a core, a pole piece assembly on said core projecting axially from one end of said coil, an armature overlying said one end of said coil, means supporting said armature for movement toward and away from said one end of said coil between an unactuated position spaced a relatively large distance from said pole piece assembly and an actuated position in which said armature is in relatively close relationship to said pole piece assembly, a device operatively coupled to said armature for actuation by said armature, and an air gap reducing ridge projecting from said armature toward said one end of said coil at a location such that said ridge overlaps a portion of said pole piece assembly when said armature is in actuated position, said ridge defining the path of least magnetic resistance between said pole piece assembly and said armature when said armature is in said unactuated position.*

*12. A relay comprising a coil, a core, a pole piece assembly on said core projecting axially from one end of said coil, an armature overlying said one end of said coil, means supporting said armature for movement toward and away from said one end of said coil between an unactuated position spaced a relatively large distance from said pole piece assembly and an actuated position in which said armature is in relatively close relationship to said pole piece assembly, and an air gap reducing ridge on said armature extending toward said one end of said coil at a location such that said ridge overlaps a portion of said pole piece assembly when said armature is in actuated position, said ridge defining the path of least magnetic resistance between said pole piece assembly and said armature when said armature is in said unactuated position.*

References Cited in the file of this patent or the original patent

UNITED STATES PATENTS

| | | |
|---|---|---|
| 738,801 | Hedman | Sept. 15, 1903 |
| 1,269,563 | Henderson | June 11, 1918 |
| 1,322,265 | Rahling | Nov. 18, 1919 |
| 2,735,968 | Bogue et al. | Feb. 21, 1956 |
| 2,916,580 | Seele | Dec. 8, 1959 |
| 2,929,001 | Wallace et al. | Mar. 15, 1960 |